United States Patent
Jia et al.

(10) Patent No.: US 7,538,594 B2
(45) Date of Patent: May 26, 2009

(54) METHOD FOR REDUCING DELAY DIFFERENCE OF DIFFERENTIAL TRANSMISSION AND SYSTEM THEREOF

(75) Inventors: Gongxian Jia, Guangdong (CN); Lun Wang, Guangdong (CN); Chunxing Huang, Guangdong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 66 days.

(21) Appl. No.: 11/519,283

(22) Filed: Sep. 12, 2006

(65) Prior Publication Data
US 2007/0121734 A1 May 31, 2007

(30) Foreign Application Priority Data
Sep. 13, 2005 (CN) .................. 2005 1 0102696

(51) Int. Cl.
*H03H 11/26* (2006.01)
*H03H 11/16* (2006.01)
(52) U.S. Cl. .................. 327/261; 327/3; 327/238; 327/254
(58) Field of Classification Search .................. 327/158, 327/161, 3, 12, 26, 38, 144, 155, 166, 167, 327/171, 234, 242, 258, 261; 375/244, 239
See application file for complete search history.

(56) References Cited

U.S. PATENT DOCUMENTS

| | | | |
|---|---|---|---|
| 6,380,786 B1 * | 4/2002 | Schenck et al. | 327/276 |
| 6,442,114 B1 * | 8/2002 | Ishibashi et al. | 369/47.17 |
| 2006/0267649 A1 * | 11/2006 | Park et al. | 327/158 |

OTHER PUBLICATIONS

Hongyan, "Time-Delay Compensation for Internet-Based Process Control Systems," Lect.; Department of Computer and Electronic Science (2005).

* cited by examiner

*Primary Examiner*—Quan Tra
*Assistant Examiner*—Colleen O'Toole
(74) *Attorney, Agent, or Firm*—Marshall, Gerstein & Borun LLP

(57) ABSTRACT

The present invention discloses a system and method for reducing delay difference of differential transmission, a certain delay difference between waveforms of the P signal and N signal is generated through controlling delay adjustment to P signal or N signal of the differential signals and controlling delay adjustment value simultaneously, to compensate for the delay difference of differential transmission due to the channels. Therefore, the present invention can reduce the delay difference of differential transmission due to property discrepancy of board materials and delay inconsistency among pins of the connectors, and at same time simplify the scheme design.

15 Claims, 5 Drawing Sheets

METHOD FOR REDUCING DELAY DIFFERENCE OF DIFFERENTIAL TRANSMISSION AND SYSTEM THEREOF

CROSS-REFERENCE TO RELATED APPLICATION

This application claims the benefit of Chinese Patent Application No. 200510102696.X, which was filed on Sep. 13, 2005, the entire disclosure of which is hereby incorporated herein by reference.

BACKGROUND OF THE DISCLOSURE

1. Field of the Technology

The present invention relates to signal transmission technology, and more particularly, to a method and system for reducing delay difference of differential transmission.

2. Background of the Invention

Along with the rapid development of high speed interconnection technology, the speed of channel transmission has become increasingly higher and has reached 10 Gbps. Generally, a pair of differential signals is adopted for high speed signal transmission. The pair of differential signals includes two signals with opposite polarities, one of which is defined as positive signal, i.e., P signal while the other is defined as negative signal, i.e., N signal. Therefore, the differential signals should be transmitted on two channels, that is to say, there are two channels for such signal transmission. At the receiving end, the received signal is obtained through subtracting the positive signal from the negative signal and then subsequent processes such as level decision are applied to the obtained signal.

Ideally, the two differential signals with opposite polarities will be transmitted to a certain point of the channel between the transmitting end and the receiving end simultaneously. Therefore, the two differential signals will be transmitted to the detector of the chip at the receiving end simultaneously. Accordingly, in order to ensure the reliability of signal transmission, the two signals with opposite polarities should have the same delay during differential signal transmission, as shown in FIG. 1, which means that the delay difference of differential transmission should be zero, and only in this case, the optimum received signal can be obtained through subtracting the positive signal from the negative signal, as shown in FIG. 2.

However, due to certain reasons such as anisotropy of the printed circuit board materials and discrepancy in real distance of differential cable, the transmission delay of the two signals with opposite polarities are inconsistent during the differential signal transmission, which means that the delay difference of the differential transmission is not zero.

FIG. 3 is a schematic diagram of differential signals with non-zero delay difference of differential transmission at the receiving end. FIG. 4 shows a schematic diagram of the received signal obtained through processing the two differential signals of FIG. 3. Obviously, the signal obtained through differential transmission shown in FIG. 4 is not an expected signal.

Therefore, the bigger the delay difference of differential transmission is, the heavier the signal jitters will occur at the receiving end, and the larger the error of the optimum sampling points for Clock and Data Recovery (CDR) will become. Deterioration of the optimum sampling points may further increase the Bit Error Ratio (BER) of received signal at the receiving end, and deteriorate the system performance.

As to the signal with relatively high speed, any deterioration may result in a sharp increase of BER, even to the extent of abnormal operation of system.

In order to solve the problem, a method for reducing delay difference of differential transmission is put forward at present. The main idea of the method is implementing delay compensation to P signal and N signal at the receiving end. As shown in FIG. 5, the delay difference compensation devices include two delay controllers, two delay modules, a subtracter, an error generating circuit and a threshold level decision (SLICER). The adaptive compensation for delay difference of differential transmission is to calculate the difference between the signals before and after the SLICER and obtain an error component. The device transmits the error component to the two delay controllers at the P end and the N end, and the delay controllers further determine delay control components based on the error component. The delay modules determine delay adjustment components at the P end and the N end according to the delay control components, and further compensate the delay difference of differential transmission generated in the channels.

SUMMARY OF THE INVENTION

The present invention provides a method for reducing delay difference of differential transmission and a system thereof. The system for reducing delay difference of differential transmission includes: a delay difference measuring device, measuring a delay difference of differential signals received at receiving end; a delay adjustment controlling device, determining a control information according to the measured delay difference; a delay adjustment device, performing delay adjustment to the differential signals according to the control information.

The method for reducing delay difference of differential transmission includes: measuring delay difference of differential signal transmission at receiving end; determining control information according to the delay difference; implementing delay adjustment to the differential signals according to the control information.

As seen from the above mentioned schemes, the system and method for reducing delay difference of differential transmission provided in the present invention is to generate a certain delay difference between waveform of P signal and that of N signal through measuring the delay difference of differential transmission and performing delay adjustment to P signal or N signal of the differential signals based on the measured delay difference, to compensate for the delay difference of differential transmission generated in the channels. Therefore, the delay difference of differential transmission caused by property discrepancy of board materials and delay inconsistency among pins of the connectors can be reduced, and at same time the scheme design is simplified.

DETAILED DESCRIPTION OF THE PREFERRED EMBODIMENTS

The present invention is hereinafter described in detail with reference to the accompanying drawings and the embodiments.

According to an embodiment of the present invention, the delay difference between P signal and N signal of the differential signals at the receiving end is measured, and then the P signal or N signal of the differential signals at the transmitting end is adjusted based on the delay difference. The delay difference of differential transmission is eliminated or reduced through measurement, feedback and adjusting.

The delay difference measured at the receiving end may be voltage difference or time difference.

The invention will be described in more detail hereinafter with reference to the embodiments by taking the measured voltage difference as an example.

Figure 1:
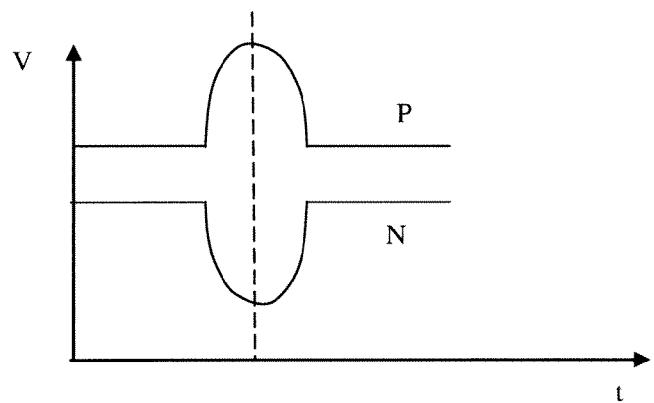
FIG. 1 is a schematic diagram of signals without delay difference received at the receiving end.
Figure 2:
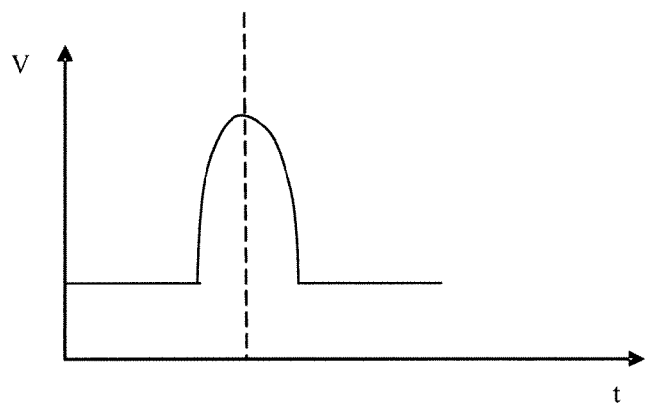
FIG. 2 is a schematic diagram of a signal obtained through performing subtract operation to the signals without delay difference received at the receiving end.
Figure 3:
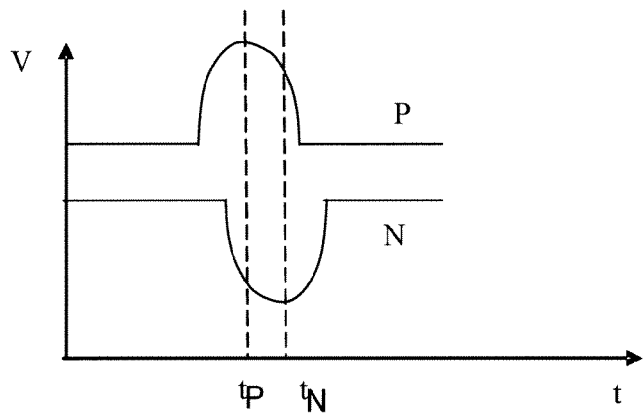
FIG. 3 is a schematic diagram of signals with delay difference received at the receiving end.
Figure 4:
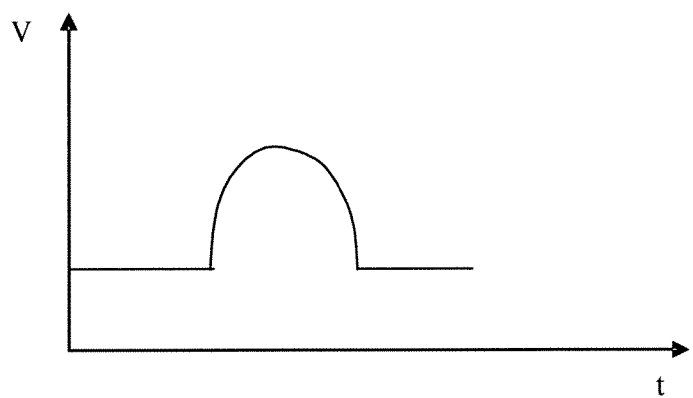
FIG. 4 is a schematic diagram of a signal obtained through performing subtract operation to the signals with delay difference received at the receiving end.
Figure 5:
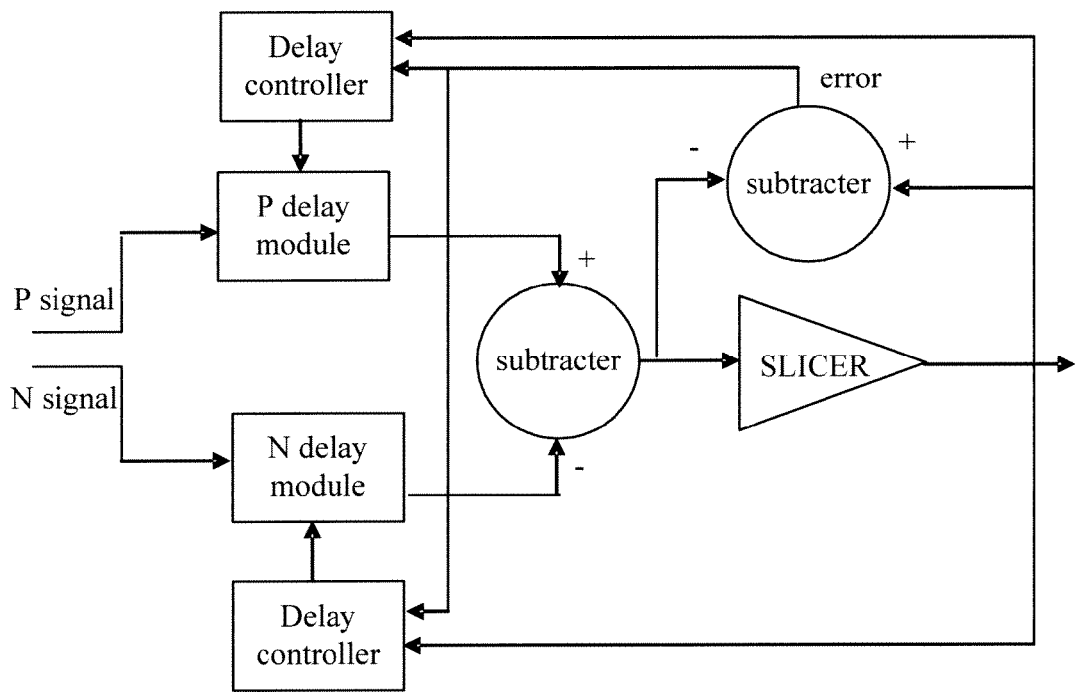
FIG. 5 is a schematic diagram of the device for removing delay difference in prior art.
Figure 6:
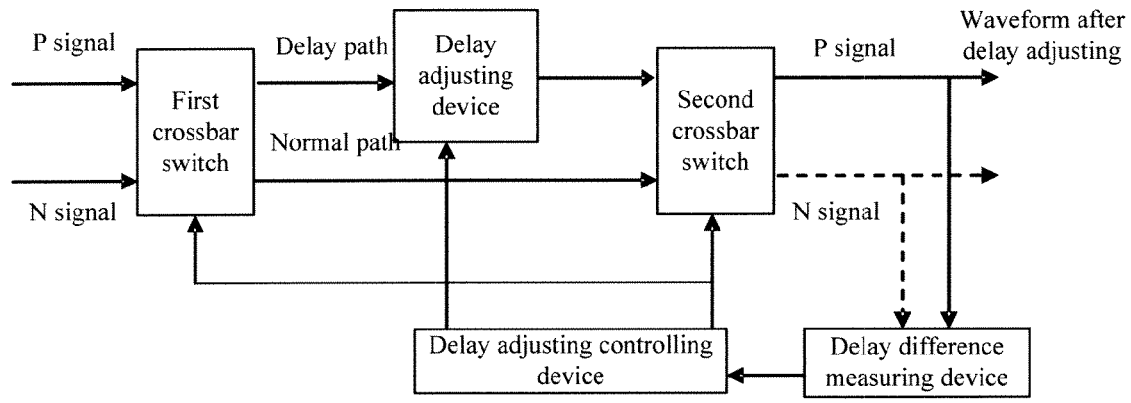
FIG. 6 is a schematic diagram of the system for reducing delay difference of differential transmission in accordance with an embodiment of the present invention.

The system for reducing delay difference of differential transmission according to the embodiment of the present invention includes, as shown in FIG. 6, a delay adjustment device, a delay adjustment controlling device, a delay difference measuring device and two crossbar switches.

The delay adjustment device is used for implementing delay adjustment to the differential signals;

The input signals of the first crossbar switch are P signals or N signals, and one output signal of the first crossbar switch is transmitted to the second crossbar switch via the delay adjustment device while the other output signal is transmitted to the second crossbar switch directly. Through the first crossbar switch, it is possible to control whether to output the P signal or N signal to the delay adjustment device, which facilitates the delay adjustment device to adjust the P signal or N signal and further eliminates the delay difference of differential transmission.

The input signals of the second crossbar switch are the adjusted differential signals. The second crossbar switch can control the output of two definite signals, i.e., it is definite that the component of the output is P signal or N signal. Obviously, in cases when the receiver does not care the component of the output is N signal or P signal, the second crossbar switch is not necessary. Alternatively, if the P signal and N signal of the differential signals can be identified through other means, the second crossbar switch is optional.

The delay difference measuring device is used for measuring the delay difference of the differential signals received at the receiving end. The delay adjustment controlling device, based on the measured delay difference, determines the control information for controlling the first crossbar switch and the delay adjustment device to implement delay adjustment. In this way, the delay adjustment device can adjust the differential signals based on the actually measured delay difference, thereby ensuring the reduction of the delay difference of differential transmission.

Figure 7:
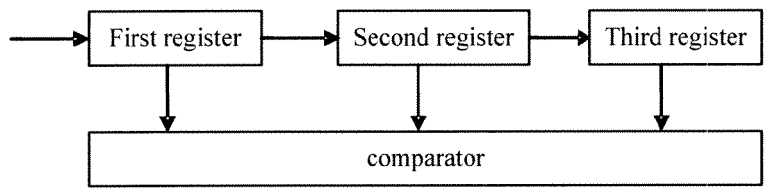
FIG. 7 is a schematic diagram of the delay adjustment controlling device of the system for reducing delay difference of differential transmission in accordance with an embodiment of the present invention.

As shown in FIG. 7, the delay adjustment controlling device includes a register group and a comparator.

The register group includes three registers, as follows:

The first register, for storing the current measured value of delay difference;

The second register, for storing the last measured value of delay difference;

The third register, for storing the last but one measured value of delay difference.

The comparator is used for comparing the measured values stored in the above three registers, obtaining control information and then outputting the control information to the delay adjustment device.

Figure 8:
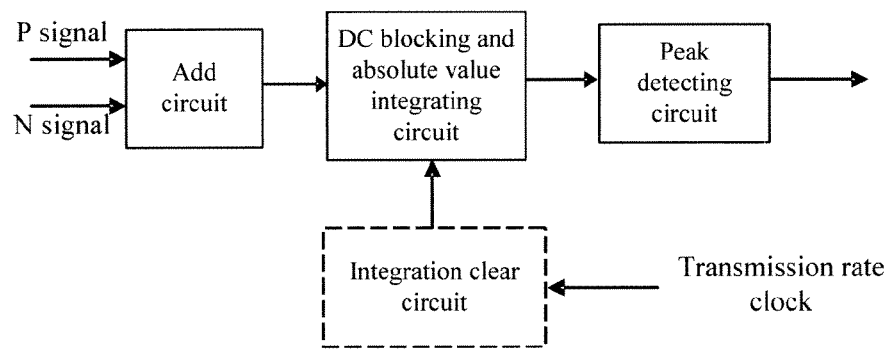
FIG. 8 is a schematic diagram of the delay difference measuring device of the system for reducing delay difference of differential transmission in accordance with an embodiment of the present invention.

As shown in FIG. 8, the delay difference measuring device includes an add circuit, a DC blocking and absolute value integrating circuit, a peak detecting circuit and an integration clear circuit.

The add circuit is used for adding the received P signal with the receive N signal, and then outputting the added signal to the DC blocking and absolute value integrating circuit;

The DC blocking and absolute value integrating circuit is used for blocking the DC component of the added signal and performing absolute value integrating calculation to the signal, and then outputting the result to the peak detecting circuit;

The peak detecting circuit is used for determining the peak value of the signal outputted by the DC blocking and absolute value integrating circuit, and outputting the peak value to the delay adjustment controlling device.

The integration clear circuit is used for clearing the DC blocking and absolute value integrating circuit after each integrating calculation.

Figure 9:
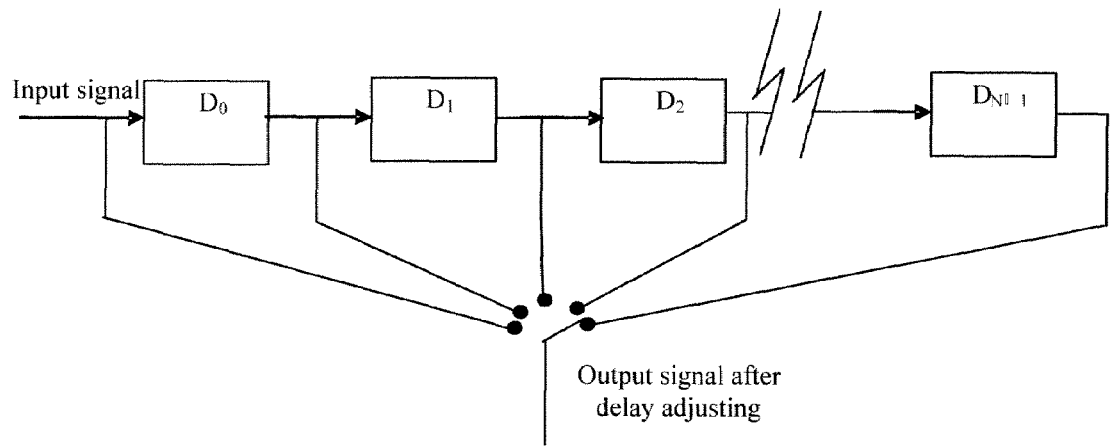
FIG. 9 is a schematic diagram of the delay adjustment device of the system for reducing delay difference of differential transmission in accordance with an embodiment of the present invention.

As shown in FIG. 9, the delay adjustment device includes a set of delay units and a delay controlling switch.

All the delay units are cascaded together, and the input signal is transmit from the input of the first delay unit, while the output of each delay unit connects with the delay controlling switch. The delay adjustment component of each delay unit is expressed as □.

The delay controlling switch determines the current delay adjustment value based on the output of the register group, and selects the output of corresponding delay unit as the output signal after delay adjustment.

In this embodiment, P signal or N signal of the differential signals which are to be sent needs to be transmitted to the delay adjustment device through the first crossbar switch, while the other signals are transmitted directly through the first crossbar switch, thereby reducing the delay difference of differential transmission effectively and simplifying the design of the chip.

In this embodiment, the transmitting end and receiving end adopt automatic negotiation mode to adjust the delay difference of differential transmission, which means continuing to measure the delay difference and adjusting the delay of differential signals until the delay difference of differential transmission is less than a preset value.

In the automatic negotiation mode, the transmitting end sends a string of specific serial codes or clock data as test differential signals, and the receiving end receives and processes the serial codes or clock data. The specific serial code may be the code with specific model. For example, there are two sub serial codes in each serial code, one includes N 1s and the other includes N 0s, e.g., 110011001100 or 0011001100110011, wherein N is a positive integer. In order to make the automatic negotiation easier, the specific serial code should be the code on which the receiving end and transmitting end agree. Meanwhile, in order to reduce negative influence due to the channel high-frequency loss and intersymbol interference on measuring precision of delay difference at the receiving end, the signal transmission rate can be lowered in the automatic negotiation mode. For instance, the transmission rate of the test differential signal can be lowered to $\frac{1}{10}$ of the normal working rate of the chip.

In order to further reduce the negative influence due to channel loss and intersymbol interference on measuring precision of delay difference, the test differential signal can be sharpened or attenuated in advance at the transmitting end, which makes the waveform of signal similar to the channel's optimal transmission waveform. The channel's optimal transmission waveform means that the frequency spectrum of the signal transmitted in the channel is the reciprocal of the channel characteristics. In this way, the optimal waveform can be received at the receiving end. All these techniques are helpful for improving the measuring precision of delay difference of differential transmission.

After the automatic negotiation ends, i.e., the delay difference of differential transmission is less than a preset value, the transmitting end starts to transmit actual differential signals.

In this embodiment, the delay adjustment device is located at the transmitting end, while the delay adjustment controlling device and the delay difference measuring device are located at the receiving end. Obviously, the delay adjustment device may be also located at the receiving end.

The operating principle of each device of the system for reducing delay difference of differential transmission will be described in detail hereinafter.

First, at the receiving end, the delay difference measuring device measures the delay difference between the received P signal and N signal. The measuring process includes the following steps:
  (1) Sum the P signal and N signal, and the obtained voltage component is the common-mode voltage of the differential signals;
  (2) Implement DC blocking and absolute value integration to the common-mode voltage. For ideal differential signals, the common-mode voltage obtained by summing P signal and N signal and DC blocking should be zero, and the result of absolute value integration is also zero. For actual differential signals, however, the common-mode voltage is not zero due to the delay difference of differential transmission, therefore, the output of the DC blocking and absolute value integrating circuit is not zero.
  (3) Peak detection circuit detects the peak value of the signal outputted by the DC block and absolute value integrating circuit, and outputs the peak value to the delay adjustment controlling device.

Second, the delay adjustment controlling device obtains the delay adjustment controlling information based on the delay difference measured by the delay difference measuring device. The procedure further includes the following steps:

(1) The delay adjustment controlling device receives the delay difference measured value from the delay difference measuring device;
  (2) Save the measured values of the delay difference received in last three times: the first register saves the current measured value; the second register saves the last measured value; while the third register saves the last but one measured value;
  (3) Compare the measured values of the delay difference saved in the three registers, and obtain the delay adjustment controlling information;
    if the current measured value saved in the first register is larger than the last measured value saved in the second register, and the last measured value is bigger than the last but one measured value saved in the third register, output a control information of switching the crossbar switch;
    if the current measured value saved in the first register is bigger than the last measured value saved in the second register, and the last measured value is less than the last but one measured value saved in the third register, output a control information of ending the delay adjustment;
    if the current measured value saved in the first register is less than the last measured value saved in the second register, output a control information of continuing to increase the delay adjustment value.

Figure 10:
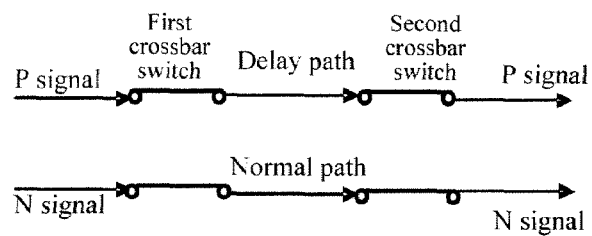
FIG. 10 is a schematic diagram of the switching of crossbar switch in accordance with an embodiment of the present invention.
Figure 10:
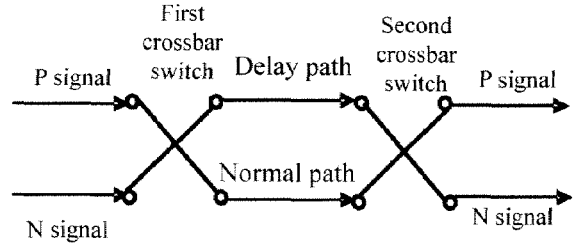

Third, when the delay adjustment controlling device sends the control information of switching the crossbar switch, as shown in FIG. 10, the two crossbar switches implement the following switching process:
  The state 1 is P signal connects to the delay path while N signal connects to the normal path. The state 2 is P signal connects to the normal path while N signal connects to the delay path. The switching process is just switching from state 2 to state 1, or switching from state 1 to state 2.

Fourth, when the delay adjustment controlling device sends the control information of ending the delay adjustment, the delay adjustment is terminated.

Fifth, when the delay adjustment controlling device sends the control information of continuing to increase delay adjustment value, the delay adjustment device chooses to add a delay adjustment component to the original delay adjustment value without switching the crossbar switches, and then implements delay adjustment to the transmitting signal according to the reset delay adjustment value.

When the delay adjustment controlling device sends the control information for starting delay adjustment, the delay adjustment device chooses the minimum delay adjustment value, selecting the corresponding switch to implement delay adjustment to the transmitting signal based on the delay adjustment value.

In above mentioned process, the precision of the delay adjustment device is $\tau$, which is the delay adjustment value of each delay unit of the delay adjustment device. It is possible to reduce $\tau$ value to improve the delay adjustment precision of the system.

Figure 11:
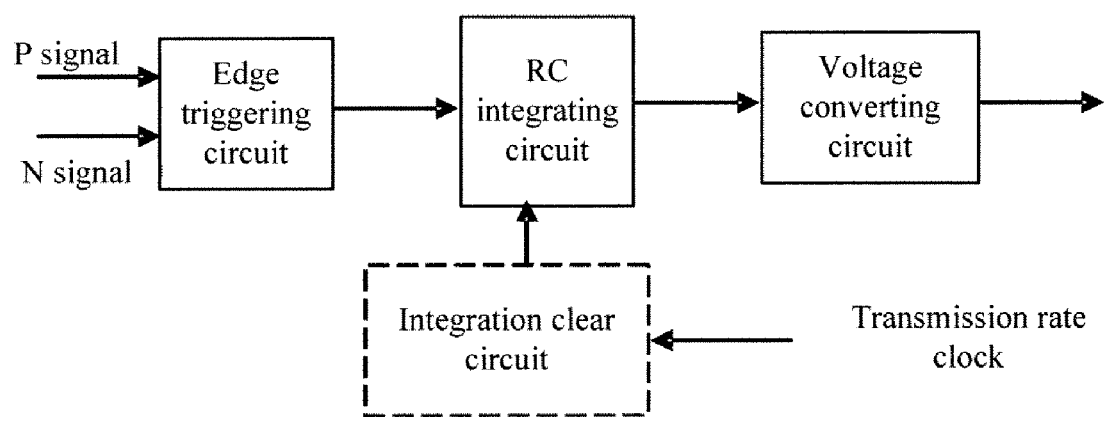
FIG. 11 is a schematic diagram of the delay difference measuring device of the system for reducing delay difference of differential transmission in accordance with another embodiment of the present invention.

According to the present embodiment, the time difference can be measured and be adopted to act as the input parameter of the delay adjustment controlling device. In this way, the delay difference measuring device is a time difference measuring device. As shown in FIG. 11, the measuring procedure of the time difference measuring device includes the following steps:
  P signal and N signal are sent respectively to the edge triggering circuit, and the edge triggering circuit is responsible for initiating and terminating the RC integrating circuit.

When the P signal arrives first, the edge triggering circuit initiates the RC integrating circuit to start integrating, and when the N signal arrives, the edge triggering circuit terminates the RC integrating circuit to stop integrating. Alternatively, when the N signal arrives first, the edge triggering circuit initiates the RC integrating circuit to start integrating, and when the P signal arrives, the edge triggering circuit terminates the RC integrating circuit to stop integrating.

The voltage-time converting circuit converts the obtained integrating voltage into time difference, according to following formula:

$$t=-RCln(1-v/V);$$

wherein, t is the time difference; v is the measured voltage value; V is voltage of power source of the RC integrating circuit; R is the resistance value and C is the capacitor value.

To sum up, a certain delay difference between waveforms of the P signal and N signal is generated through controlling the implementation of delay adjustment to P signal or N signal of the differential signals and controlling the delay component simultaneously, to compensate for the delay difference of differential transmission occurring in the channels. Therefore, the present invention can solve the delay difference of differential transmission due to property discrepancy of board materials and delay inconsistency among pins of the connectors, and meanwhile simplifies the scheme design.

The foregoing are only the preferred embodiments of the present invention and is not intended to limit the scope of the present invention. Any modification, equivalent substitution, or improvement made without departing from the spirit and principle of the present invention should be covered by the scope set forth in the appended claims.

The invention claimed is:

1. A system for reducing delay difference of differential transmission, comprising:
    a first cross-point switch, adapted to receive a positive signal and a negative signal of a differential signal, to switch one of the positive signal and the negative signal as a first signal to a delay adjustment device for delay adjustment, and to switch the other one of the positive signal and the negative signal as a second signal output;
    the delay adjustment device being adapted to perform delay adjustment to the first signal to obtain an adjusted first signal; and,
    a delay adjustment controlling device, adapted to obtain a delay difference between the second signal and the adjusted first signal, to determine control information according to the delay difference, and to transmit the control information to the delay adjustment device for controlling latter delay adjustment of the delay adjustment device;
    wherein the delay adjustment controlling device comprises:
    a first register adapted to store a current value of the delay difference;
    a second register adapted to store a last value of the delay difference;
    a third register adapted to store a second to last value of the delay difference; and
    a comparator adapted to determine the control information through comparing the values of the delay difference stored in the first, second, and third registers and output the control information to the delay adjustment device, and further adapted
    to determine that the control information is for switching from adjusting the first signal to adjusting the second signal if the current value is larger than the last value and the last value is larger than the second to last value;
    to determine that the control information is for maintaining a current delay adjustment value if the current value is larger than the last value and the last value is smaller than the second to last value; and
    to determine that the control information is for increasing a delay adjustment value if the current value is smaller than the last value.

2. The system according to claim 1, further comprising:
    a second cross point switch, adapted to receive the second signal and the adjusted first signal, and to output the second signal and the adjusted first signal according to a positive definition and a negative definition.

3. The system according to claim 1, wherein the delay adjustment device comprises a delay controlling switch and at least one delay unit; wherein,
    the delay controlling switch has an output and at least two inputs, the number of the inputs of the delay controlling switch being equal to the number of the delay unit(s) plus one; one input of the delay controlling switch being adapted to receive the first signal, and the other input(s) of the delay controlling switch being respectively connected with an output of each of the at least one delay unit;
    the at least one delay unit is adapted to receive the first signal and perform delay adjustment to the first signal; and
    the delay controlling switch is adapted to determine current delay adjustment value according to the control information outputted from the delay adjustment controlling device, and select to put through one of the inputs of the delay controlling switch to the output of the delay controlling switch.

4. The system according to claim 1, wherein the delay adjustment device is located at a transmitting end of the differential signals.

5. The system according to claim 1, wherein the delay adjustment device is located at a receiving end of the differential signals.

6. A method for reducing delay difference of differential transmission, comprising:
    receiving, by a first cross-point switch, a positive signal and a negative signal of differential signals, switching one of the positive signal and the negative signal as a first signal to a delay adjustment device for delay adjustment, and switching the other one of the positive signal and the negative signal as a second signal output;
    performing, by the delay adjustment device, delay adjustment to the first signal to obtain an adjusted first signal; and,
    obtaining, by a delay adjustment controlling device, a delay difference between the second signal and the adjusted first signal, determining control information according to the delay difference, and transmitting the control information to the delay adjustment device for controlling latter delay adjustment of the delay adjustment device,
    wherein said process of determining control information according to the delay difference comprises: storing, by the delay difference adjustment controlling device, last two or more values of the delay difference; and determining, by the delay difference adjustment controlling device, the control information through comparing the two or more than two values of the delay difference;

wherein said process of storing the last two or more values of the delay difference comprises storing the last three values of the delay difference;

the process of determining the control information through comparing the two or more values of the delay difference comprises:

if the current value is larger than the last value and the last value is larger than the second to last value, determining that the control information is for switching from adjusting the first signal to adjusting the second signal;

if the current value is larger than the last value and the last value is smaller than the second to last value, determining that the control information is for maintaining a current delay adjustment value; and if the current value is smaller than the last value, determining that the control information is for increasing delay adjustment value.

7. The method according to claim 6, further comprising:
summing the second signal and the adjusted first signal of the differential signals to obtain a first result;
blocking a direct current (DC) component of the first result and then integrate an absolute value of the first result to obtain a second result; and,
detecting a peak value of the second result, and taking the peak value as the delay difference.

8. The method according to claim 6, further comprising:
integrating, by a resistance capacitor (RC) circuit, in response to the second signal and the adjusted first signal to obtain an integrated result; and
obtaining a time difference according to the integrated result and taking the time difference as the delay difference.

9. The method according to claim 8, wherein the time difference is obtained according to a following formula:

$$t=-RC\ln(1-v/V)$$

wherein t is the time difference, v is the integrated result, V is a power voltage of the RC integrating circuit, R is the value of the resistance of the RC integrating circuit, C is the value of the capacitor of the RC integrating circuit.

10. The method according to claim 6, wherein the delay adjustment value is an integral multiple of a preset delay adjustment unit;
the process of increasing the delay adjustment value comprises adding one delay adjustment unit to the current delay adjustment value.

11. The method according to claim 6, wherein the differential signals comprise test differential signals and actual differential signals, the method further comprising:
if detecting that the delay difference is larger than a preset value, transmitting the test differential signals to the delay difference adjustment device for adjustment; and
if detecting that the delay difference is equal to or smaller than the preset value, transmitting the actual differential signals to the delay difference adjustment device for adjustment.

12. The method according to claim 11, wherein the test differential signals comprise:
a first sequence, comprising N ones; and
a second sequence, comprising N zeros; wherein N is a positive integer.

13. The system according to claim 1, further comprising:
a delay difference measuring device, adapted to receive the second signal and the adjusted first signal, measure the delay difference between the second signal and the adjusted first signal, and transmit the delay difference to the delay adjustment controlling device.

14. The system according to claim 13, wherein the delay difference measuring device comprises:
an add circuit, adapted to receive the second signal and the adjusted first signal, sum the second signal and the adjusted first signal to obtain a first result;
a direct current (DC) blocking and absolute value integrating circuit, adapted to block a DC component of the first result outputted by the add circuit, and integrate an absolute value of the first result to obtain a second result;
a peak detecting circuit, adapted to determine a peak value of the second result outputted by the DC blocking and absolute value integrating circuit, and output the peak value as the delay difference to the delay difference adjustment controlling device; and
an integration clear circuit, adapted to clear the DC blocking and absolute value integrating circuit after each integrating calculation.

15. The system according to claim 13, wherein the delay difference measuring device comprises an edge triggering circuit, a resistance capacitor (RC) circuit, a voltage-time converting circuit and an integration clear circuit;
the edge triggering circuit is adapted to receive the second signal and the adjusted first signal, and adapted to start and stop the RC integrating circuit in response to the second signal and the adjusted first signal received;
the RC integrating circuit is adapted to start integration and stop integration under control of the edge triggering circuit, and output an integrated voltage;
the voltage-time converting circuit is adapted to convert the integrated voltage into a time difference, and output the time difference as the delay difference to the delay difference adjustment controlling device; and
the integration clear circuit is adapted to clear the RC integrating circuit after each integrating processing.

* * * * *